US012390001B2

(12) United States Patent
Gerrity

(10) Patent No.: US 12,390,001 B2
(45) Date of Patent: Aug. 19, 2025

(54) BODY WORN TRAY FOR HOLDING PAINTING TOOLS

(71) Applicant: John Gerrity, Mullica Hill, NJ (US)

(72) Inventor: John Gerrity, Mullica Hill, NJ (US)

( * ) Notice: Subject to any disclaimer, the term of this patent is extended or adjusted under 35 U.S.C. 154(b) by 273 days.

(21) Appl. No.: 18/201,273

(22) Filed: May 24, 2023

(65) Prior Publication Data

US 2024/0389744 A1 Nov. 28, 2024

(51) Int. Cl.
*A45F 5/02* (2006.01)
*B44D 3/24* (2006.01)
*A45F 5/00* (2006.01)

(52) U.S. Cl.
CPC ................ *A45F 5/021* (2013.01); *B44D 3/24* (2013.01); *A45F 5/1575* (2025.01)

(58) Field of Classification Search
CPC ......... A45F 5/021; A45F 5/1575; B44D 3/24; B44D 3/14; F16M 13/04; E04F 21/02
USPC .................................... 224/183, 904; 108/43
See application file for complete search history.

(56) References Cited

U.S. PATENT DOCUMENTS 1,865,885 A * 7/1932 Byhre ..................... E04F 21/06 294/3.5
2,409,331 A * 10/1946 Wood ................... A47D 13/027 224/159
4,750,657 A * 6/1988 King ....................... B43L 3/008 224/220
5,163,591 A 11/1992 Leiserson
5,221,032 A * 6/1993 Bott .......................... A45F 5/00 224/678
5,489,051 A * 2/1996 Robinson ................ A45F 5/021 220/570
6,508,390 B1 * 1/2003 Karpati ..................... A45F 5/00 224/678
D499,553 S 12/2004 Millard
6,910,429 B1 * 6/2005 Matay ...................... B25H 3/06 108/44
7,243,991 B2 * 7/2007 Ojeda .................... B60N 3/002 108/26
7,337,901 B2 * 3/2008 Phillips .................... B25H 3/06 206/349
7,425,027 B2 * 9/2008 Carney ................... E04G 21/00 294/3.5
7,950,335 B1 * 5/2011 Almond ............... G03B 17/561 108/26
9,211,760 B2 12/2015 Bajuyo
9,642,444 B2 5/2017 Krol
11,324,306 B2 * 5/2022 Joye ......................... A45F 5/021
11,503,903 B2 * 11/2022 Haddy ................... A47B 3/083
12,102,246 B2 * 10/2024 Boscarino .......... A47G 23/0641
(Continued)

FOREIGN PATENT DOCUMENTS

FR 2990338 * 11/2013 ......... A47G 23/0608
WO WO2017176991 10/2017

OTHER PUBLICATIONS

FR2990338 Translation. (Year: 2013).*

*Primary Examiner* — Adam J Waggenspack

(57) ABSTRACT

A tool support assembly for supporting paint, spackle, and other tools on a user's body includes a tray with a belt attached so that a user may support the tray by wearing the belt around the user's torso. A tube is coupled to the tray and shaped to hold a paint cup in the tube. Several other holding structures are provided for holding other tools.

18 Claims, 7 Drawing Sheets

(56) References Cited

U.S. PATENT DOCUMENTS

| | | | | |
|---|---|---|---|---|
| 2003/0006156 | A1 * | 1/2003 | McCracken | B44D 3/14 206/562 |
| 2003/0111497 | A1 | 6/2003 | Lukaris | |
| 2004/0200870 | A1 * | 10/2004 | Haber | A45F 3/14 224/259 |
| 2006/0037987 | A1 * | 2/2006 | Lin | A45F 5/00 206/320 |
| 2008/0272269 | A1 | 11/2008 | Moravsky | |
| 2016/0120342 | A1 * | 5/2016 | Petersburg | A47G 19/065 220/628 |
| 2017/0055687 | A1 | 3/2017 | Diaz | |
| 2019/0110581 | A1 | 4/2019 | Cohen | |
| 2022/0287454 | A1 * | 9/2022 | Wescott, Sr. | A45F 3/005 |

* cited by examiner

BODY WORN TRAY FOR HOLDING PAINTING TOOLS

(g) BACKGROUND OF THE INVENTION

(1) Field of the Invention

The disclosure relates to tool support apparatuses and more particularly pertains to a new tool support apparatus for supporting paint, spackle, and other tools on a user's body.

(2) Description of Related Art Including Information Disclosed Under 37 CFR 1.97 and 1.98

The prior art discloses myriad tool support apparatuses for supporting various tools on a person's body, including devices which hook paint and other tools to a user's belt and devices comprising a harness which position paint cans on the user's body. The prior art does not, however, describe a device comprising a tray that is attached to a belt for wearing around a torso of a user, and which includes a tube for supporting a paint cup therein. Such an apparatus would be advantageous, because the apparatus may be used to interchangeably insert various paint cups in the tube and provides a tray surface to set objects on. Additional features not disclosed by the prior art include a dish which is insertable into the tube to carry spackle or other objects such as fasteners, and various holding means for holding paint brushes, spackle knives, driver tools, rags, and other tools.

(h) BRIEF SUMMARY OF THE INVENTION

An embodiment of the disclosure meets the needs presented above by generally comprising a tray with an upper surface. The tray has a first side and a second side positioned opposite each other across the upper surface and a third side and a fourth side positioned opposite each other across the upper surface and extending between the first and second sides. A paint support is coupled to the tray and comprises a tube extending downwardly through the tray. The tube has an open top, and an inner dimension of the tube has a size such that the tube is configured to receive a paint cup and support the paint cup on an upper edge of the tube. A belt is coupled to and forms a loop with the first side of the tray. The belt has a length such that the belt is configured to be worn around a torso of a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
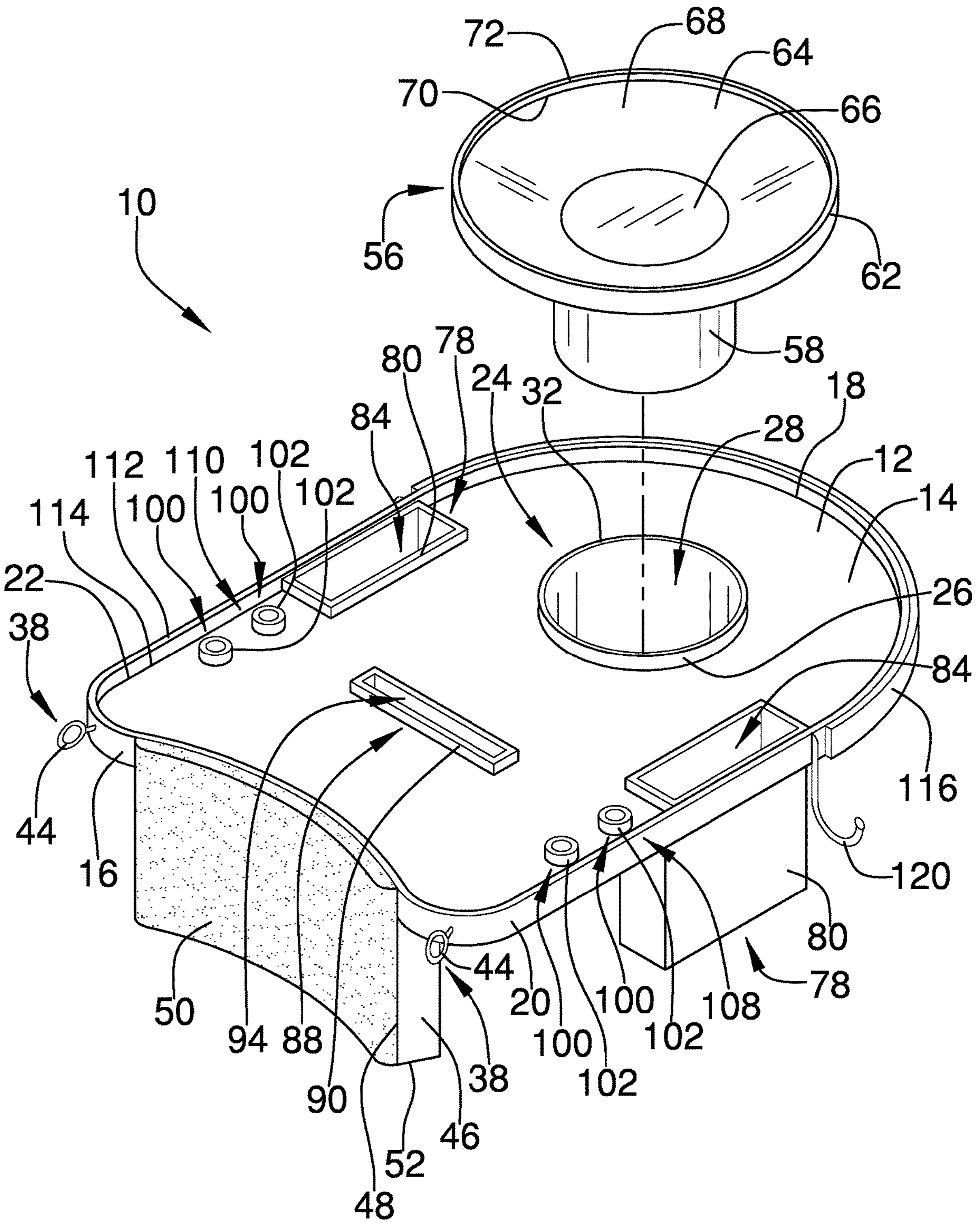
FIG. 1 is a top perspective exploded view of a tool support assembly according to an embodiment of the disclosure.
Figure 2:
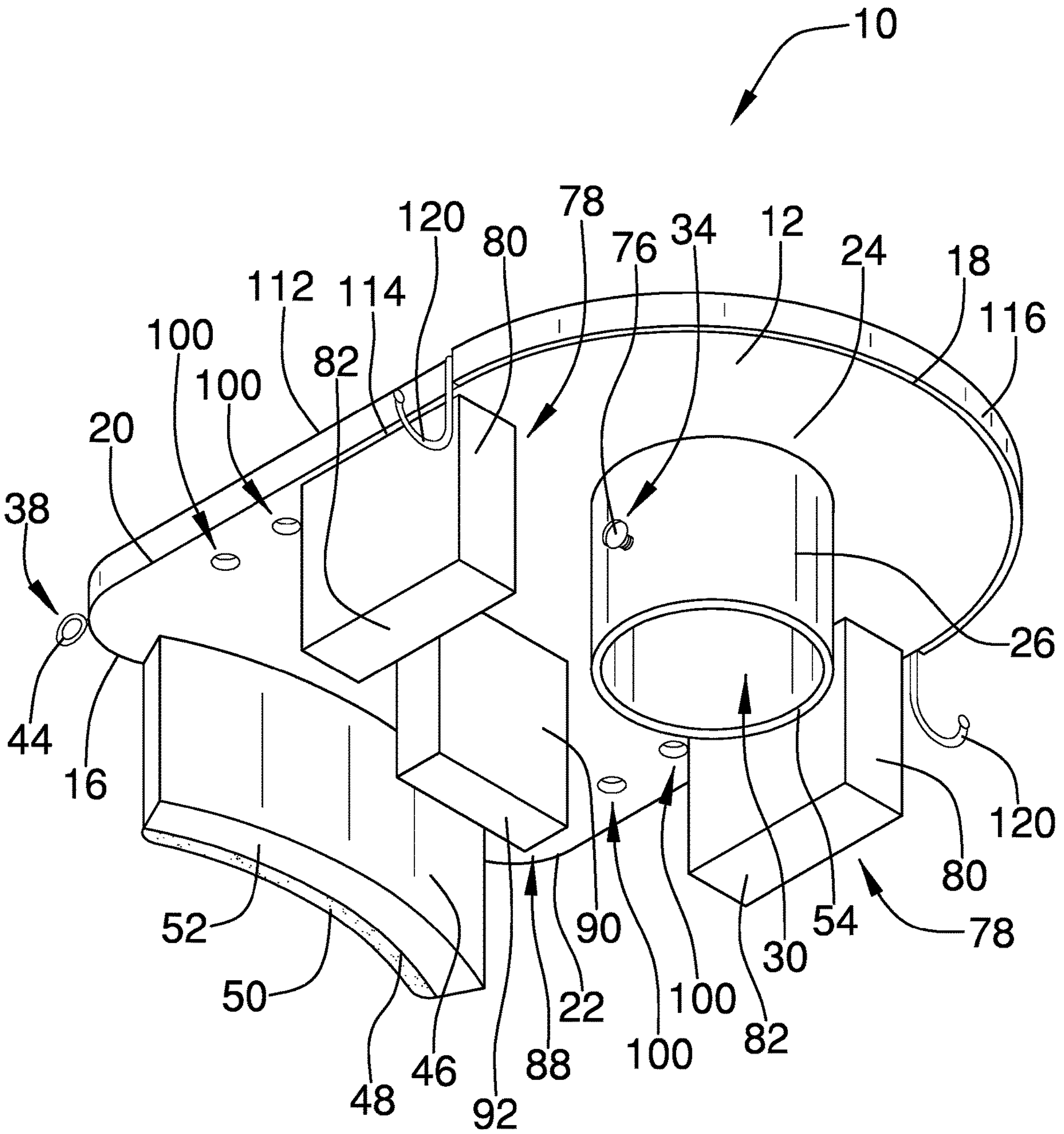
FIG. 2 is a bottom perspective view of an embodiment of the disclosure.
Figure 3:
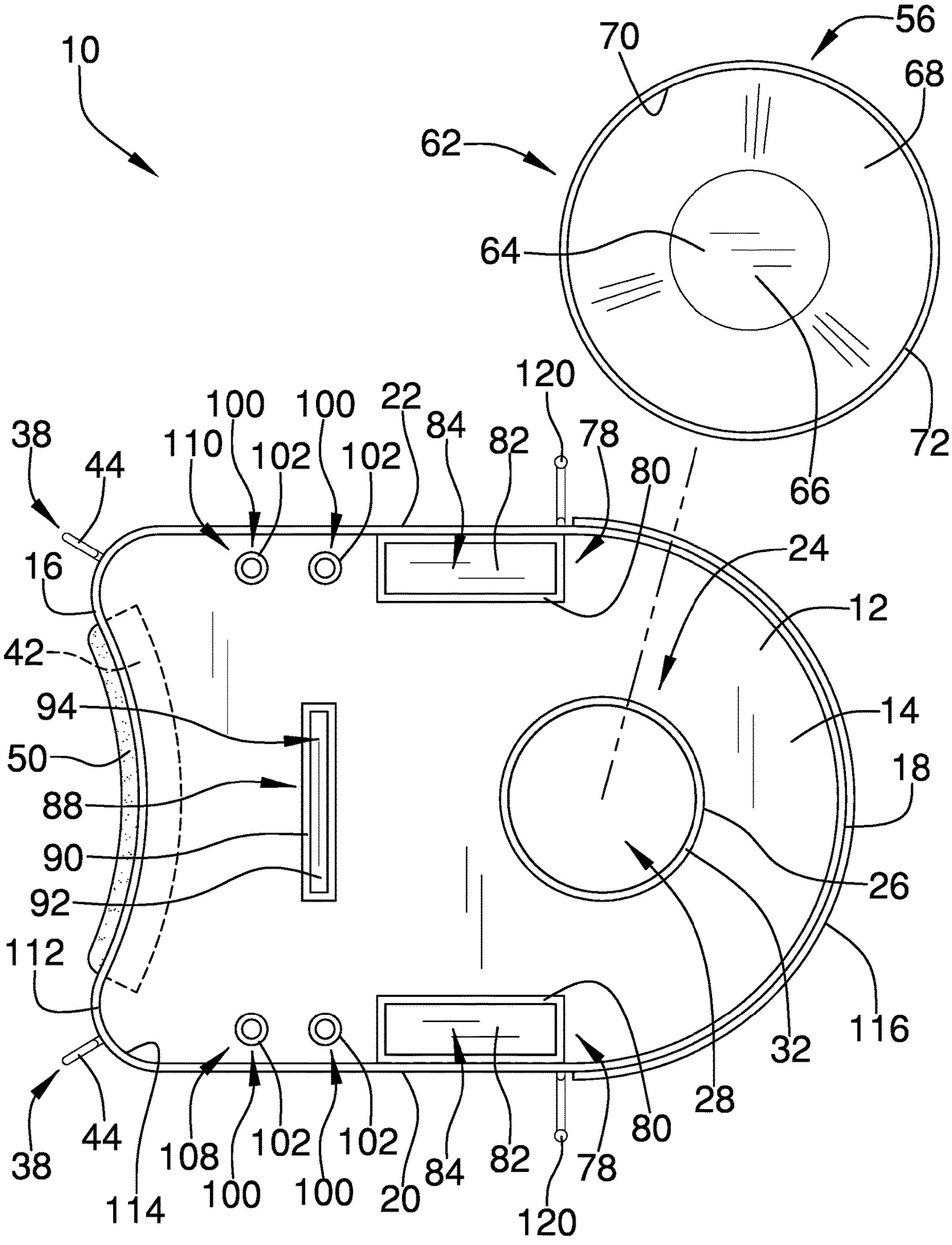
FIG. 3 is a top exploded view of an embodiment of the disclosure.
Figure 4:
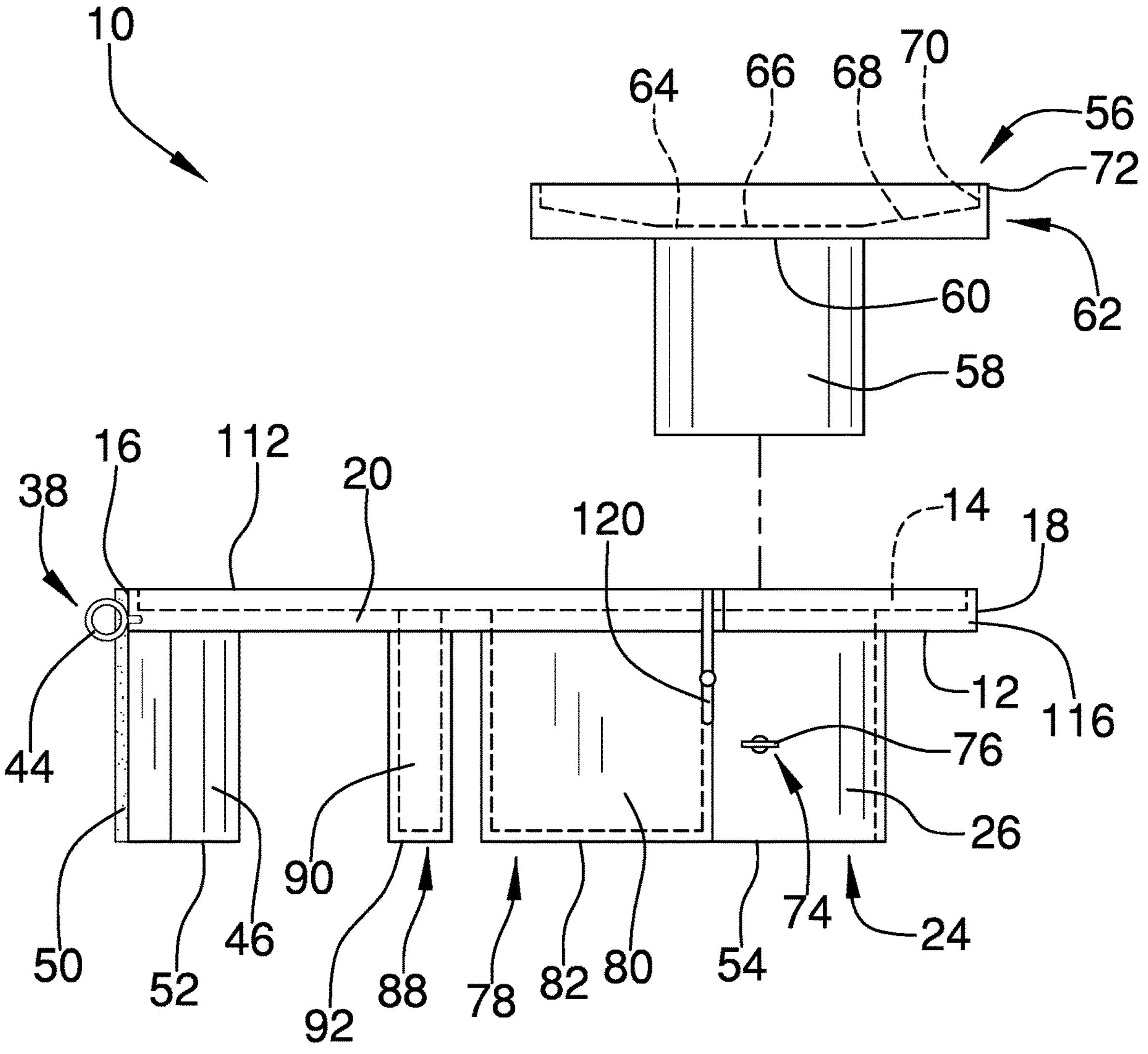
FIG. 4 is a side exploded view of an embodiment of the disclosure.
Figure 5:
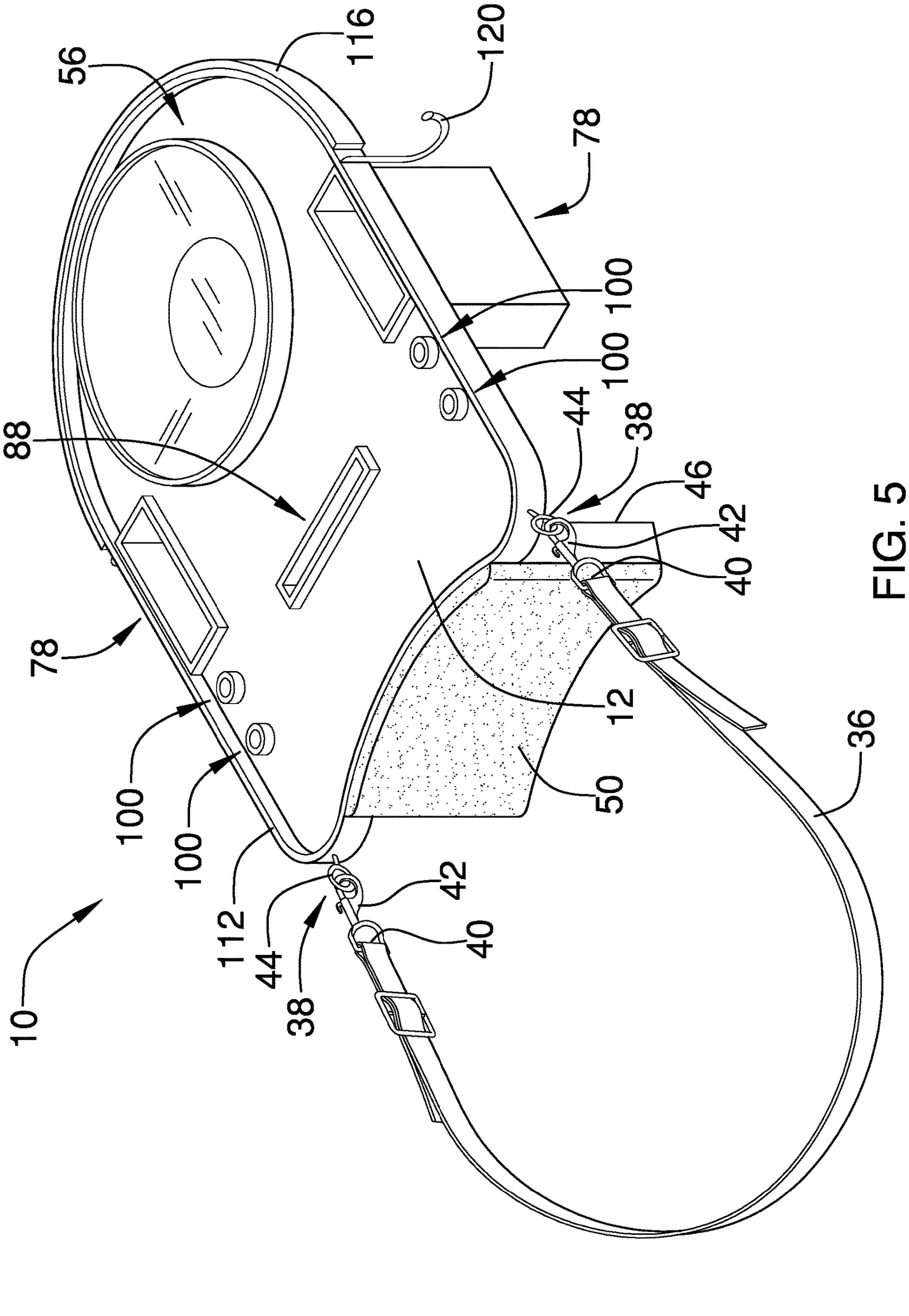
FIG. 5 is a top perspective assembled view of an embodiment of the disclosure.
Figure 6:
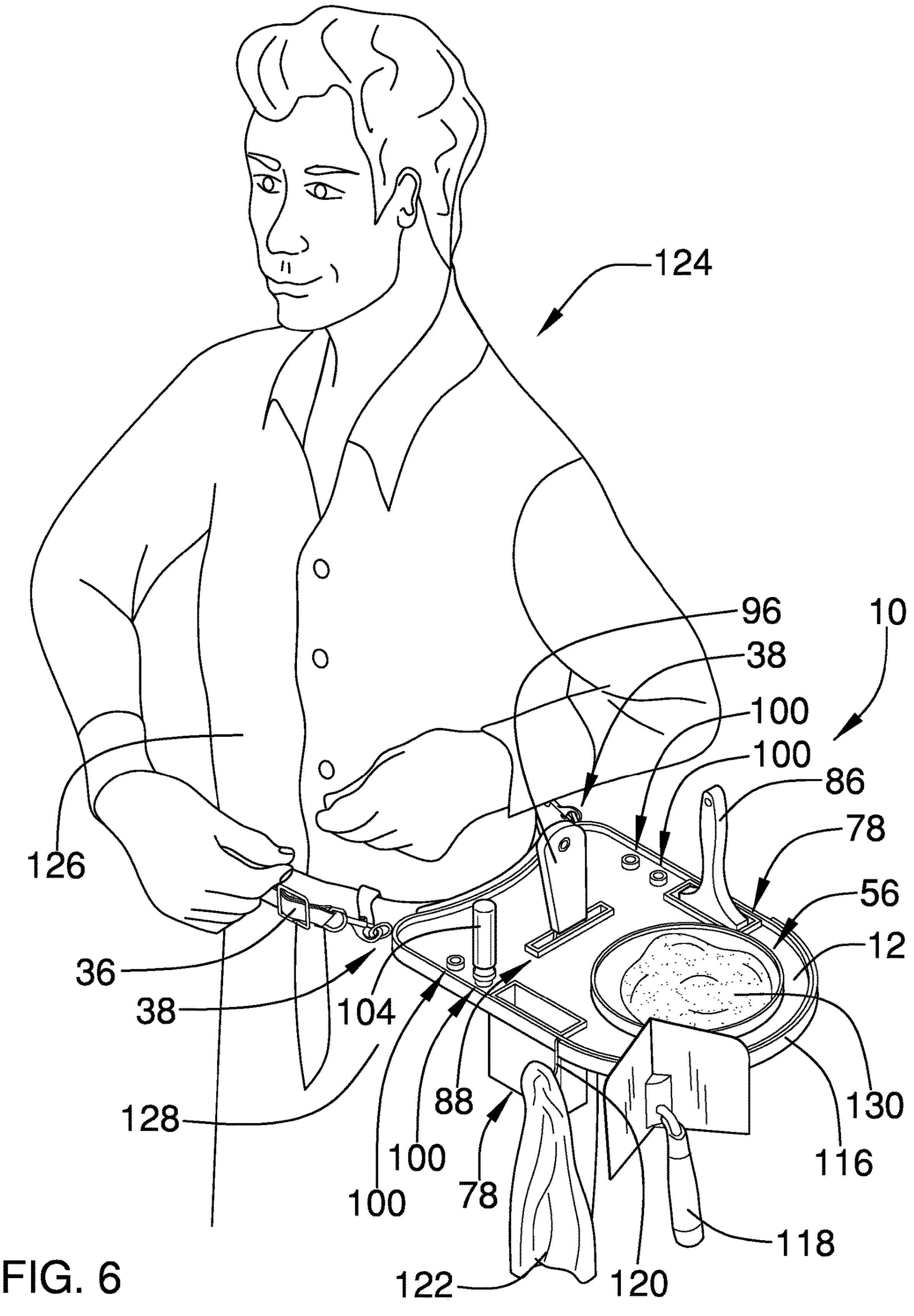
FIG. 6 is an in-use view of an embodiment of the disclosure.
Figure 7:
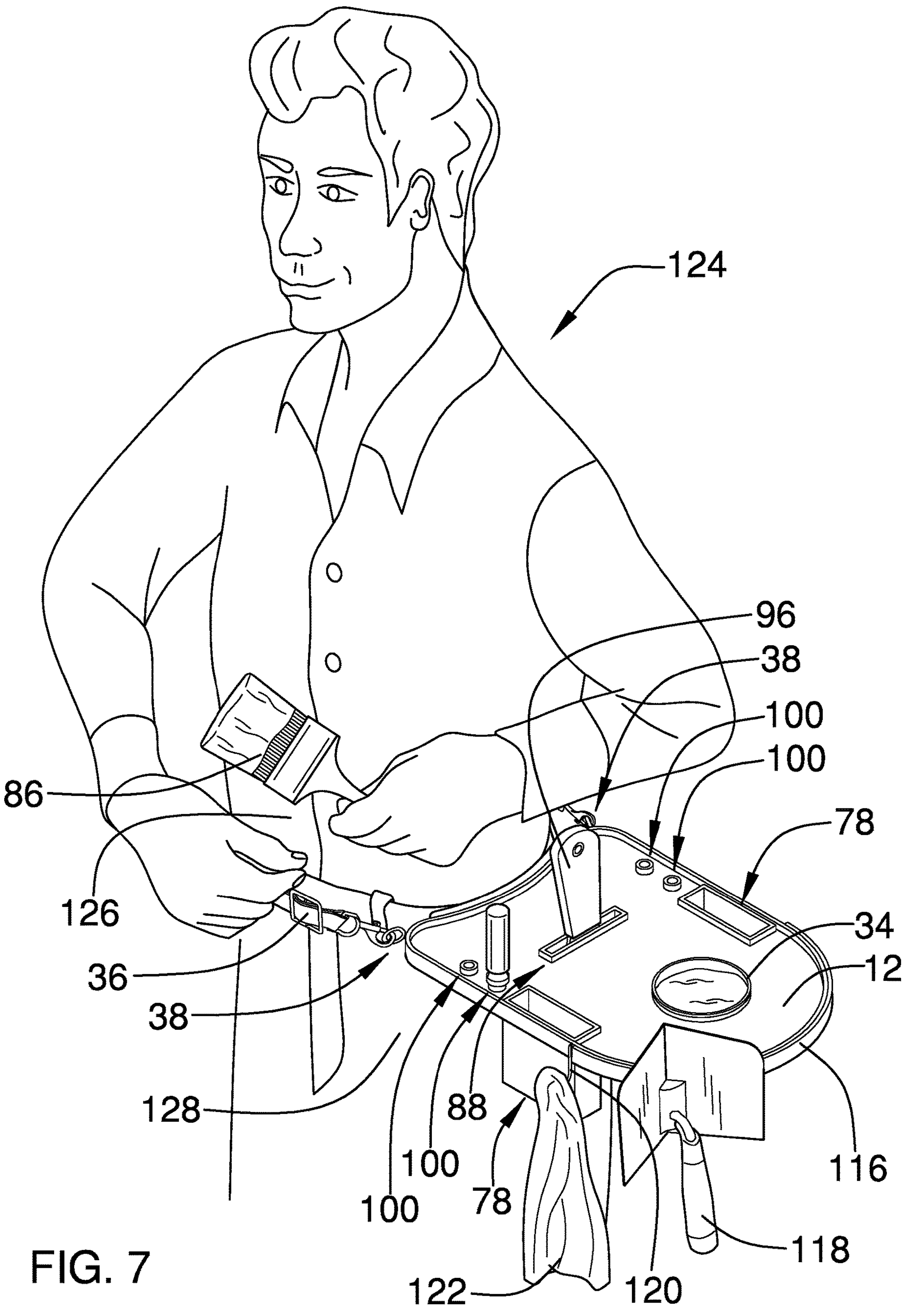
FIG. 7 is an in-use view of an embodiment of the disclosure.

With reference now to the drawings, and in particular to FIGS. 1 through 7 thereof, a new tool support apparatus embodying the principles and concepts of an embodiment of the disclosure and generally designated by the reference numeral 10 will be described.

As best illustrated in FIGS. 1 through 7, the tool support assembly 10 generally comprises a tray 12 with an upper surface 14. The tray 12 has a first side 16 and a second side 18 positioned opposite each other across the upper surface 14. The tray 12 also has a third side 20 and a fourth side 22 positioned opposite each other across the upper surface 14 and extending between the first and second sides 16, 18. The second side 18 is convexly arcuate to avoid unintentionally hooking the tray 12 onto obstructions.

A paint support 24 is coupled to the tray 12 and comprises a tube 26 extending downwardly through the tray 12. The tube 26 has an open top 28, and an inner dimension of the tube 26 has a size such that the tube 26 is configured to receive a paint cup 34 and support the paint cup 34 on an upper edge 32 of the tube 26. A portion of the tube 26 extends upwardly from the upper surface 14 of the tray 12 to retain spilled fluids from entering 44 into the tube 26 from the upper surface 14 of the tray 12. The tube 26 has a cylindrical shape and a diameter of between 3.0 inches and 3.5 inches. The tube 26 has an open bottom 30 and is integrally formed with the tray 12.

A belt 36 is coupled to and forms a loop with the first side 16 of the tray 12. The belt 36 has a length such that the belt 36 is configured to be worn around a torso 126 of a user 124. The length of the belt 36 may also be adjustable through conventional means. A pair of connectors 38 is coupled to the belt 36 and the tray 12 to releasably connect the belt 36 to the tray 12. Each connector 38 of the pair of connectors 38 is coupled to one of a pair of ends 40 of the belt 36. Each connector 38 of the pair of connectors 38 comprises a clasp 42 and a ring 44. The clasp 42 is coupled to the belt 36, the ring 44 is coupled to the tray 12, and the clasp 42 is releasably linked to the ring 44.

A hip support 46 is coupled to the tray 12 at the first side 16 and extends downwardly therefrom. The hip support 46 is positioned such that the hip support 46 is configured for engaging a body 128 of the user 124 when the belt 36 is worn around the torso 126 of the user 124 to maintain the upper surface 14 of the tray 12 in a horizontal orientation. The hip support 46 has an engagement surface 48. The engagement surface 48 of the hip support 46 and the first side 16 of the tray 12 face a same direction and are concavely arcuate to generally conform to the body 128 of the user 124. The hip support 46 is integrally formed with the tray 12. A padding 50 is coupled to the first side 16 of the tray 12 and the support surface of the hip support 46. The padding 50 comprises a compressible material such that the padding 50 is configured to cushion the body 128 of the user 124 when the hip support 46 engages the body 128.

A bottom surface 52 of the hip support 46 and a bottom edge 54 of the tube 26 of the paint support 24 lie on a same plane such that the bottom surface 52 of the hip support 46 and the bottom edge 54 of the tube 26 of the paint support 24 are configured for resting on a planar support surface and spacing the tray 12 above the planar support surface.

A dish 56 is insertable into the open top 28 of the tube 26 of the paint support 24. The dish 56 comprises an insertion member 58, a plate 62, and a raised edge 72. The insertion member 58 is insertable into the tube 26, and the plate 62 is coupled to a top end 60 of the insertion member 58. The plate 62 extends outwardly from the insertion member 58 and has a top surface 64 configured for supporting a quantity of spackle 130. The top surface 64 has a center portion 66 and an outer portion 68, wherein the outer portion 68 surrounds the center portion 66 and is angled downwardly from a circumferential edge 70 of the top surface 64 toward the center portion 66. The raised edge 72 extends along a circumferential edge 70 of the top surface 64 of the plate 62. The dish 56 may also be used to hold fasteners or other objects. A retainer 74 is coupled to the paint support 24 and is engageable with the insertion member 58 of the dish 56 to retain the plate 62 at a selected height above the tray 12. The retainer 74 comprises a pair of set screws 76 extending through the tube 26 of the paint support 24.

A pair of brush holders 78 is coupled to the tray 12. Each brush holder 78 of the pair of brush holders 78 has a perimeter wall 80 which is coupled to and extends downwardly through the tray 12 and a bottom wall 82 which is coupled to the perimeter wall 80. The perimeter wall 80 and the bottom wall 82 define a cavity 84 therein which has a size such that the brush holder 78 is configured for holding a flat paint brush 86. The cavity 84 may have a rectangular shape with a length of between 2.5 inches and 3.5 inches and a width of between 1.0 inch and 1.5 inches. A portion of the perimeter wall 80 extends upwardly from the upper surface 14 of the tray 12 to inhibit the spilled fluids from moving into the brush holder 78 from the upper surface 14 of the tray 12. Each brush holder 78 of the pair of brush holders 78 is integrally formed with the tray 12. Each brush holder 78 of the pair of brush holders 78 is positioned adjacent to and oriented parallel to an associated one of the third side 20 and fourth side 22.

A scraper holder 88 is coupled to the tray 12, the scraper holder 88 has a peripheral wall 90 which is coupled to and extends downwardly through the tray 12 and a base wall 92 which is coupled to the peripheral wall 90. The peripheral wall 90 and the base wall 92 define a slot 94 therein which has a size such that the scraper holder 88 is configured for insertion of a blade 98 of a spackle knife 96 such that a handle of the spackle knife 96 is supported over the slot 94. The slot 94 may have a length of between 4.0 inches and 4.5 inches. A portion of the peripheral wall 90 extends upwardly from the upper surface 14 of the tray 12 to inhibit the spilled fluids from moving into the scraper holder 88 from the upper surface 14 of the tray 12. The scraper holder 88 is integrally formed with the tray 12. The scraper holder 88 is positioned between the first side 16 of the tray 12 and the paint support 24 and is oriented perpendicularly to each of the third side 20 and the fourth side 22.

A plurality of driver holders 100 is coupled to the tray 12. Each driver holder 100 of the plurality of driver holders 100 comprises a collar 102 which is coupled to and extends downwardly through the tray 12. An inner diameter of the collar 102 has a size such that the driver holder 100 is configured for holding a shaft 106 of a driving tool 104 such that a handle of the driving tool 104 is supported over the tray 12. A portion of each driver holder 100 of the plurality of driver holders 100 extends upwardly from the upper surface 14 of the tray 12 to inhibit the spilled fluids from moving into the scraper holder 88 from the upper surface 14 of the tray 12. Each driver holder 100 of the plurality of driver holders 100 is integrally formed with the tray 12. A first pair 108 of driver holders 100 of the plurality of driver holders 100 is positioned adjacent to the third side 20 of the tray 12, and a second pair 110 of driver holders 100 of the plurality of driver holders 100 is positioned adjacent to the fourth side 22 of the tray 12.

A lip 112 is coupled to a perimeter edge 114 of the upper surface 14 of the tray 12 and extends upwardly therefrom. The lip 112 is integrally formed with the tray 12 and retains the spilled fluids from falling from the upper surface 14 over the perimeter edge 114 of the upper surface 14. A magnet 116 is coupled to and extends along the second side 18 of the tray 12. The magnet 116 is configured for holding ferromagnetic tools. The magnet 116 is particularly advantageous for storing irregularly shaped tools. For example, a ferromagnetic corner drywall trowel 118 may be held on the magnet 116. A pair of hooks 120 is also mounted to the tray 12. Each hook 120 of the pair of hooks 120 is positioned on an associated one of the third side 20 and the fourth side 22 of the tray 12. Each hook 120 of the pair of hooks 120 is configured for holding a rag 122.

In use, the belt 36 is worn around the torso 126 of the user 124 and the hip support 46 engages the user's 124 body 128 to maintain the upper surface 14 of the tray 12 in the horizontal orientation. To hold paint, the paint cup 34 is filled with paint and inserted into the paint support 24. To hold the spackle 130 or other objects, the dish 56 is inserted into the paint support 24 and retained at a selected height via the retainer 74. Various tools are selectively supported by the tool support assembly 10 as further described above.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tool support assembly comprising:

a tray having an upper surface, the tray having a first side and a second side positioned opposite each other across the upper surface, the tray having a third side and a fourth side positioned opposite each other across the upper surface and extending between the first and second sides;

a paint support being coupled to the tray, the paint support comprising a tube extending downwardly through the tray, the tube having an open top, an inner dimension of the tube having a size such that the tube is configured to receive a paint cup and support the paint cup on an upper edge of the tube;

a belt being coupled to and forming a loop with the first side of the tray, the belt having a length such that the belt is configured to be worn around a torso of a user;

a dish, the dish being insertable into the open top of the tube of the paint support, the dish comprising:

an insertion member being insertable into the tube; and a plate being coupled to a top end of the insertion member, the plate extending outwardly from the insertion member, the plate having a top surface configured for supporting a quantity of spackle; and a retainer being coupled to the paint support and being engageable with the insertion member of the dish to retain the plate at a selected height above the tray.

2. The assembly of claim 1, wherein the tube of the paint support has a cylindrical shape, the tube having a diameter of between 3.0 inches and 3.5 inches.

3. The assembly of claim 1, further comprising a pair of connectors being coupled to the belt and the tray to releasably connect the belt to the tray, each connector of the pair of connectors being coupled to one of a pair of ends of the belt.

4. The assembly of claim 3, wherein each connector of the pair of connectors comprises a clasp and a ring, the clasp being coupled to the belt, the ring being coupled to the tray, the clasp being releasably linked to the ring.

5. The assembly of claim 1, further comprising a hip support being coupled to the tray at the first side and extending downwardly therefrom, the hip support being positioned such that the hip support is configured for engaging a body of the user when the belt is worn around the torso of the user to maintain the upper surface of the tray in a horizontal orientation.

6. The assembly of claim 5, wherein the hip support has an engagement surface, the engagement surface of the hip support and the first side of the tray facing a same direction, a support surface and the first side of the tray being concavely arcuate.

7. The assembly of claim 5, wherein a bottom surface of the hip support and a bottom edge of the tube of the paint support lie on a same plane such that the bottom surface of the hip support and the bottom edge of the tube of the paint support are configured for resting on a planar support surface and spacing the tray above the planar support surface.

8. The assembly of claim 5, further comprising a padding being coupled to the first side of the tray and a support surface of the hip support, the padding comprising a compressible material such that the padding is configured to cushion the body of the user when the hip support engages the body.

9. The assembly of claim 1, wherein the top surface has a center portion and an outer portion, the outer portion surrounding the center portion and being angled downwardly from a circumferential edge of the top surface toward the center portion, the dish further comprising a raised edge extending along a circumferential edge of the top surface of the plate.

10. The assembly of claim 1, wherein the retainer comprises a pair of set screws extending through the tube of the paint support.

11. The assembly of claim 1, further comprising a lip being coupled to a perimeter edge of the upper surface of the tray and extending upwardly therefrom.

12. The assembly of claim 11, further comprising a magnet being coupled to and extending along the second side of the tray, the magnet being configured for holding ferromagnetic tools.

13. The assembly of claim 1, further comprising a brush holder being coupled to the tray, the brush holder having a perimeter wall being coupled to and extending downwardly through the tray and a bottom wall being coupled to the perimeter wall, the perimeter wall and the bottom wall defining a cavity therein, the cavity having a size such that the brush holder is configured for holding a flat paint brush.

14. The assembly of claim 1, further comprising a scraper holder being coupled to the tray, the scraper holder having a peripheral wall being coupled to and extending downwardly through the tray and a base wall being coupled to the peripheral wall, the peripheral wall and the base wall defining a slot therein, the slot having a size such that the scraper holder is configured for insertion of a blade of a spackle knife such that a handle of the spackle knife is supported over the slot.

15. The assembly of claim 1, further comprising a driver holder being coupled to the tray, the driver holder comprising a collar being coupled to and extending downwardly through the tray, an inner diameter of the collar having a size such that the driver holder is configured for holding a shaft of a driving tool such that a handle of the driving tool is supported over the tray.

16. The assembly of claim 1, further comprising a hook being mounted to the tray, the hook being positioned on one of the third side and the fourth side of the tray, the hook being configured for holding a rag.

17. The assembly of claim 1, wherein the tube of the paint support has an open bottom.

18. A tool support assembly comprising:

a tray having an upper surface, the tray having a first side and a second side positioned opposite each other across the upper surface, the tray having a third side and a fourth side positioned opposite each other across the upper surface and extending between the first and second sides, the first side being concavely arcuate, the second side being convexly arcuate;

a paint support being coupled to the tray, the paint support comprising a tube extending downwardly through the tray, the tube having an open top, a portion of the tube extending upwardly from the upper surface of the tray, an inner dimension of the tube having a size such that the tube is configured to receive a paint cup and support the paint cup on an upper edge of the tube, the tube having a cylindrical shape, the tube having a diameter of between 3.0 inches and 3.5 inches, the tube having an open bottom, the paint support being integrally formed with the tray;

a belt being coupled to and forming a loop with the first side of the tray, the belt having a length such that the belt is configured to be worn around a torso of a user;

a pair of connectors being coupled to the belt and the tray to releasably connect the belt to the tray, each connector of the pair of connectors being coupled to one of a pair of ends of the belt, each connector of the pair of connectors comprising a clasp and a ring, the clasp being coupled to the belt, the ring being coupled to the tray, the clasp being releasably linked to the ring;

a hip support being coupled to the tray at the first side and extending downwardly therefrom, the hip support being positioned such that the hip support is configured for engaging a body of the user when the belt is worn around the torso of the user to maintain the upper surface of the tray in a horizontal orientation, the hip support having an engagement surface, the engagement surface of the hip support and the first side of the tray facing a same direction, the support surface being concavely arcuate, a bottom surface of the hip support and a bottom edge of the tube of the paint support lying on a same plane such that the bottom surface of the hip support and the bottom edge of the tube of the paint support are configured for resting on a planar support surface and spacing the tray above the planar support surface, the hip support being integrally formed with the tray;

a padding being coupled to the first side of the tray and the support surface of the hip support, the padding comprising a compressible material such that the padding is configured to cushion the body of the user when the hip support engages the body;

a dish, the dish being insertable into the open top of the tube of the paint support, the dish comprising:

an insertion member being insertable into the tube;

a plate being coupled to a top end of the insertion member, the plate extending outwardly from the insertion member, the plate having a top surface configured for supporting a quantity of spackle, the top surface having a center portion and an outer portion, the outer portion surrounding the center portion and being angled downwardly from a circumferential edge of the top surface toward the center portion; and a raised edge extending along a circumferential edge of the top surface of the plate;

a retainer being coupled to the paint support and being engageable with the insertion member of the dish to retain the plate at a selected height above the tray, the retainer comprising a pair of set screws extending through the tube of the paint support;

a lip being coupled to a perimeter edge of the upper surface of the tray and extending upwardly therefrom, the lip being integrally formed with the tray;

a pair of brush holders being coupled to the tray, each brush holder of the pair of brush holders having a perimeter wall being coupled to and extending downwardly through the tray and a bottom wall being coupled to the perimeter wall, the perimeter wall and the bottom wall defining a cavity therein, the cavity having a size such that the brush holder is configured for holding a flat paint brush, a portion of the perimeter wall extending upwardly from the upper surface of the tray, each brush holder of the pair of brush holders being integrally formed with the tray, each brush holder of the pair of brush holders being positioned adjacent to and oriented parallel to an associated one of the third side and fourth side;

a scraper holder being coupled to the tray, the scraper holder having a peripheral wall being coupled to and extending downwardly through the tray and a base wall being coupled to the peripheral wall, the peripheral wall and the base wall defining a slot therein, the slot having a size such that the scraper holder is configured for insertion of a blade of a spackle knife such that a handle of the spackle knife is supported over the slot, a portion of the peripheral wall extending upwardly from the upper surface of the tray, the scraper holder being integrally formed with the tray, the scraper holder being positioned between the first side of the tray and the paint support, the scraper holder being oriented perpendicularly to each of the third side and the fourth side;

a plurality of driver holders being coupled to the tray, each driver holder of the plurality of driver holders comprising a collar being coupled to and extending downwardly through the tray, an inner diameter of the collar having a size such that the driver holder is configured for holding a shaft of a driving tool such that a handle of the driving tool is supported over the tray, each driver holder of the plurality of driver holders being integrally formed with the tray, a first pair of driver holders of the plurality of driver holders being positioned adjacent to the third side of the tray, a second pair of driver holders of the plurality of driver holders being positioned adjacent to the fourth side of the tray;

a magnet being coupled to and extending along the second side of the tray, the magnet being configured for holding ferromagnetic tools; and a pair of hooks being mounted to the tray, each hook of the pair of hooks being positioned on an associated one of the third side and the fourth side of the tray, each hook of the pair of hooks being configured for holding a rag.

* * * * *